United States Patent
Eckman et al.

(10) Patent No.: US 11,790,546 B2
(45) Date of Patent: *Oct. 17, 2023

(54) POINT CLOUD ANNOTATION FOR A WAREHOUSE ENVIRONMENT

(71) Applicant: Lineage Logistics, LLC, Irvine, CA (US)

(72) Inventors: Christopher Frank Eckman, San Francisco, CA (US); Alexander Ming Zhang, Daly City, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/972,725

(22) Filed: Oct. 25, 2022

(65) Prior Publication Data

US 2023/0042965 A1    Feb. 9, 2023

Related U.S. Application Data

(63) Continuation of application No. 16/985,950, filed on Aug. 5, 2020, now Pat. No. 11,508,078.

(51) Int. Cl.
*G06T 7/521* (2017.01)
*G06T 7/70* (2017.01)
(Continued)

(52) U.S. Cl.
CPC ............ *G06T 7/521* (2017.01); *G01S 7/4817* (2013.01); *G01S 17/89* (2013.01); *G06T 7/70* (2017.01);
(Continued)

(58) Field of Classification Search
CPC ....... G06T 7/521; G06T 7/70; G06T 2200/24; G06T 2207/10028; G06T 2207/30252;
(Continued)

(56) References Cited

U.S. PATENT DOCUMENTS 6,420,698 B1 *  7/2002  Dimsdale ............. G01C 15/002
                                                250/234
6,545,705 B1 *  4/2003  Sigel ...................... H04N 7/188
                                                348/222.1
(Continued)

FOREIGN PATENT DOCUMENTS

CA       2822980           7/2012
CA       2822980 A1 *      7/2012
(Continued)

*Primary Examiner* — Mahendra R Patel
(74) *Attorney, Agent, or Firm* — Barnes & Thornburg LLP

(57) ABSTRACT

A system is provided for automatic identification and annotation of objects in a point cloud in real time. The system can automatically annotate a point cloud that identifies coordinates of objects in three-dimensional space while data is being collected for the point cloud. The system can train models of physical objects based on training data, and apply the models to point clouds that are generated by various point cloud generating devices to annotate the points in the point clouds with object identifiers. The solution of automatically annotated point cloud can be used for various applications, such as blueprints, map navigation, and determination of robotic movement in a warehouse.

20 Claims, 8 Drawing Sheets

(51) Int. Cl.
  *G01S 7/481* (2006.01)
  *G01S 17/89* (2020.01)
  *G06V 20/05* (2022.01)
  *H04N 23/54* (2023.01)
  *B60R 11/00* (2006.01)
  *B60R 11/04* (2006.01)

(52) U.S. Cl.
  CPC ............. *G06V 20/05* (2022.01); *H04N 23/54* (2023.01); *B60R 11/04* (2013.01); *B60R 2011/004* (2013.01); *G06T 2200/24* (2013.01); *G06T 2207/10028* (2013.01); *G06T 2207/30252* (2013.01)

(58) Field of Classification Search
  CPC ........ G01S 7/4817; G01S 17/89; G01S 17/86; G01S 17/931; G06V 20/56; G06V 20/64; H04N 23/54; H04N 23/57; B60R 11/04; B60R 2011/004
  USPC .......................................................... 382/104
  See application file for complete search history.

(56) References Cited

U.S. PATENT DOCUMENTS

| | | | |
|---|---|---|---|
| 8,195,394 B1 * | 6/2012 | Zhu | G08G 1/09626 |
| | | | 382/107 |
| 8,990,235 B2 * | 3/2015 | King | G06F 40/197 |
| | | | 707/769 |
| 9,407,675 B1 * | 8/2016 | Ludwig | H04N 7/142 |
| 9,824,453 B1 * | 11/2017 | Collins | G06V 20/20 |
| 10,185,542 B2 * | 1/2019 | Carson | G06F 3/167 |
| 10,970,542 B2 * | 4/2021 | Endres | G06F 18/2321 |
| 11,063,937 B1 | 7/2021 | Son et al. | |
| 11,069,082 B1 * | 7/2021 | Ebrahimi Afrouzi | H04N 23/56 |
| 11,118,911 B2 * | 9/2021 | Flint | G06T 7/246 |
| 11,508,078 B2 | 11/2022 | Eckman et al. | |
| 2008/0247636 A1 * | 10/2008 | Davis | G09G 5/00 |
| | | | 382/152 |
| 2012/0033069 A1 * | 2/2012 | Becker | G01S 17/89 |
| | | | 345/592 |
| 2018/0130196 A1 * | 5/2018 | Loveland | B64D 47/08 |
| 2018/0232954 A1 * | 8/2018 | Frank | A01C 3/02 |
| 2019/0066408 A1 * | 2/2019 | Vijayan | G07C 5/085 |
| 2019/0258225 A1 * | 8/2019 | Link | G05B 19/4097 |
| 2019/0340433 A1 * | 11/2019 | Frank | G01C 21/3841 |
| 2020/0050727 A1 * | 2/2020 | Zweigle | G06F 30/392 |
| 2020/0143559 A1 * | 5/2020 | Tahir | G06T 7/593 |
| 2020/0191555 A1 * | 6/2020 | Zweigle | G01S 7/4865 |
| 2020/0195900 A1 * | 6/2020 | Sodhi | H04N 9/3194 |
| 2020/0265621 A1 * | 8/2020 | Santos | G06T 11/00 |
| 2020/0293992 A1 * | 9/2020 | Bogolea | G06T 7/74 |
| 2020/0379116 A1 * | 12/2020 | Ramadneh | G01S 7/4808 |
| 2020/0394815 A1 * | 12/2020 | Wohlfeld | G06T 7/70 |
| 2020/0408913 A1 * | 12/2020 | Pompe | H04N 1/3876 |
| 2021/0108926 A1 | 4/2021 | Tran | |
| 2022/0044430 A1 | 2/2022 | Eckman et al. | |

FOREIGN PATENT DOCUMENTS

| | | |
|---|---|---|
| CA | 2892554 | 9/2014 |
| EP | 3745159 A1 * | 12/2020 |
| EP | 3758351 A1 * | 12/2020 |
| WO | WO2017171005 | 10/2017 |
| WO | WO-2017171005 A1 * | 10/2017 |
| WO | 2018089268 | 5/2018 |
| WO | WO-2018089268 A1 * | 5/2018 |
| WO | WO-2020225889 A1 * | 11/2020 |
| WO | WO3758351 | 12/2020 |

* cited by examiner

POINT CLOUD ANNOTATION FOR A WAREHOUSE ENVIRONMENT

CROSS-REFERENCE TO RELATED APPLICATIONS

This application is a continuation of U.S. application Ser. No. 16/985,950, filed on Aug. 5, 2020. The disclosure of the prior application is considered part of (and is incorporated by reference in) the disclosure of this application.

TECHNICAL FIELD

This document generally relates to point cloud annotation in a warehouse environment.

BACKGROUND

Warehouses include warehouse racks to store pallets of goods. Pallets are generally flat transport structures that support goods in a stable matter and that are adapted to fit forklifts and/or other devices/machines to move the pallets. Packages of various products can be stacked on top of the pallets. Warehouses have been designed to permit forklifts to put and pull pallets from racks as needed. Forklifts and other sorts of vehicles move through a warehouse and transport pallets and packages. Warehouse management, such as monitoring transportation and storage of packets and packages, may use point cloud technologies which can generate digital models representative of warehouses. A point cloud is a set of data points in space, which may be created by measuring a large number of points on external surfaces of objects or environments.

SUMMARY

Some embodiments described herein include computer-based technology for automatically annotating a point cloud that models a warehouse environment.

The technologies described herein can include a system for providing automatic identification and annotation of objects in a point cloud during processing. The system can automatically annotate a point cloud that identifies coordinates of objects (and their subparts) in three-dimensional space. The system can train models of physical objects based on training data, and then apply the models to point clouds that are generated by various point cloud generating devices to annotate the points in the point clouds with object identifiers. Examples of such point cloud generating devices include devices using stereoscopic vision, LIDAR, etc. The annotations can be applied in real time (or near real time) and can be used to provide a variety of enhancements, such as annotating objects in a display, deleting objects from the point cloud, and/or generating maps/models of the physical space. Such annotated point clouds can be used to create blueprints of warehouses.

The system can include a vehicle equipped with an image capturing device (e.g., a camera) and a space scanning device (e.g., an optical scanner). As the vehicle moves around in a room, the image capturing device is configured to capture images of objects. The space scanning device is configured to measure distances to the objects and generate optical scan data (e.g., point cloud data) usable to generate a point cloud of the room. The system can process the images to recognize the objects and project the identification of the objects on the point cloud by annotating the optical scan data with object identifiers. Objects in a point cloud can be annotated with various identifiers, such as using names, numbers, colors, line types, symbols, and/or other suitable identification methods.

As applied in a warehouse environment, for example, the system can provide annotated point clouds that allow pallets and other items to be identified easily and accurately in different warehouses, without requiring multiple software programs specifically adapted to various environments of such different warehouses. In some implementations, annotated point clouds can be used in various environments, such as warehouses using automated robots and/or forklifts, to identify different parts, pallets, or items within the environments (e.g., warehouses). Further, three-dimensional aspects of annotated point clouds allow for monitoring a separation in distance between two items in the warehouse, such as a distance separation between a pallet and a pallet carrier (e.g., forklift, robot, etc.). When annotations are known in a point cloud, such annotations can be used in various applications that need annotated point clouds.

Further, the annotated point clouds generated by the system can make it easy to section out separate pallets and other objects which are relatively close to each other, and also provide clear identification of pallets and objects which may be at least partially hidden by other parts (e.g., other pallets, racks, shelves, frames, forklifts, humans, etc.). In some implementations, a frame-to-frame annotation is performed to generate an annotated point cloud. For example, annotations can be provided to each of the images (frames) that are taken by a digital video capturing device. In some implementations, the frame-to-frame annotation can take an "average" annotated object. In this method, an item that has once been fully captured in a frame can be used to improve a later frame. For example, if an item that has been recognized in an earlier frame at a higher accuracy is partially or inaccurately shown in a later frame, and/or if a camera view starts to obscure the item (as it moves to change the view, for example), the earlier frame can be used to construct or supplement the partial image of the item in the current frame, thereby help raising the accuracy of the obscured item.

Moreover, the system can provide point clouds that permit for undesired objects (e.g., people, forklifts, moving objects, or noise) to be easily filtered out from the point clouds. For example, the system can provide annotated point clouds that identify, and filter out, forklifts and humans, thereby improving accuracy in identifying objects (e.g., pallets) around the forklifts and humans. By removing undesired or unnecessary objects, the system can focus on permanent structures and easily turn the point cloud to a blue-print of the warehouse. This allows creating more accurate and faster point clouds to blueprints post scan.

The annotated point clouds generated by the system can further be used to train models for identifying objects from collected optical scan data (e.g., point cloud data). For example, the system can improve recognition of moving objects, such as pallets, forklifts, humans, etc., which frequently or constantly change their positions and orientations in a warehouse. Further, knowledge of exact locations of identified, labeled poles can allow a coordinate system (e.g., a Simultaneous Location and Mapping (SLAM) system) to use that specific pole to create a more accurate pose (x-y-z location).

The solution of automatically annotated point cloud can be used for various applications, such as blueprints, map navigation, and determination of robotic movement in a warehouse (e.g., whether or not automatic robots or forklifts can perform some movement in the warehouse).

Particular embodiments described herein include a computer-implemented method that includes receiving, from a vehicle, optical scan data and image data in real time as the vehicle moves in a warehouse; recognizing objects that are represented in the image data; determining identifiers that represent the objects; annotating the optical scan data with the identifiers to generate annotated point cloud data; and transmitting the annotated point cloud data to a display device configured to present a point cloud based on the annotated point cloud data in real time.

In some implementations, the method can optionally include one or more of the following features. Recognizing objects may include training an object identification model; and identifying the objects using the object identification model. Training an object identification model includes training the object identification model based on the annotated point cloud data. The method may include identifying first annotated objects that are represented in the annotated point cloud data; and filtering data indicative of the first annotated objects from the annotated point cloud data. The point cloud may be presented without the first annotated objects. The first annotated objects may include forklifts and humans in the warehouse. The method may include retrieving a rule defining undesired objects; and removing data representative of the undesired objects from the annotated point cloud data. The method may include receiving a user selection of an object; and removing data representative of the object from the annotated point cloud data. The vehicle may include a camera system configured to capture images of the objects and generate the image data, and an optical scan system configured to measure distance to the objects and generate the optical scan data. The optical scan system may include a light detection and ranging (LIDAR) system. The vehicle may include a forklift. The method may include generating the annotated point cloud data into a blueprint of the warehouse.

Particular embodiments described herein include a system that may include a vehicle, a camera affixed to the vehicle and configured to capture images and generate image data, an optical scanner affixed to the vehicle and configured to measure distances to objects and generate spatial scan data, and a computing device communicatively coupled to the camera and the optical scanner. The computing device may be configured to perform operations comprising: receiving, from the vehicle, the image data and the optical scan data in real time as the vehicle moves in a warehouse; recognizing objects that are represented in the image data; determining identifiers that represent the objects; annotating the optical scan data with the identifiers to generate annotated point cloud data; and transmitting the annotated point cloud data to a display device configured to present a point cloud based on the annotated point cloud data in real time.

In some implementations, the method can optionally include one or more of the following features. Recognizing objects may include training an object identification model, and identifying the objects using the object identification model. Training an object identification model may include training the object identification model based on the annotated point cloud data. The operations may include identifying first annotated objects that are represented in the annotated point cloud data, and filtering data indicative of the first annotated objects from the annotated point cloud data, wherein the point cloud is presented without the first annotated objects. The first annotated objects may include forklifts and humans in the warehouse. The operations may include retrieving a rule defining undesired objects, and removing data representative of the undesired objects from the annotated point cloud data. The operations may include receiving a user selection of an object, and removing data representative of the object from the annotated point cloud data. The optical scanner may include a light detection and ranging (LIDAR) system.

Particular embodiments described herein include a non-transitory computer-readable storage medium having instructions stored thereon which, when executed by one or more processors, cause the one or more processors to perform operations comprising: receiving optical scan data and image data; recognizing objects that are represented in the image data; determining identifiers that represent the objects; annotating the optical scan data with the identifiers to generate annotated point cloud data; identifying first annotated objects that are represented in the annotated point cloud data; removing data indicative of the first annotated objects from the annotated point cloud data; and transmitting the annotated point cloud data to a display device configured to present a point cloud based on the annotated point cloud data, the point cloud being presented without the first annotated objects.

The devices, system, and techniques described herein may provide one or more of the following advantages. Some embodiments described herein include a system for automatic identification and annotation of objects in a point cloud that models a 3D environment (e.g., a warehouse) to create the point cloud having all objects labeled, thereby permitting for a blueprint of the 3D environment to be created therefrom. Further, the system can provide an annotated point cloud that identifies all parts therein in real time or near real time, thereby improving accuracy in tracking moving objects (e.g., forklifts in a warehouse). Moreover, the system provides point clouds that annotate objects regardless of the characteristics of different warehouses or environments (e.g., layouts, sizes, shapes, types, etc.), thereby enabling fast, clear, and accurate identification and counting of the objects without requiring sophisticated and time-consuming algorithms adapted for different warehouses or environments. Further, the system can provide a simple solution to remove uninterested objects and generate filtered point clouds of environments that can only show objects of interest without requiring post-processing and manual correction. Accurate blueprints of the environments can be thus created faster with improved quality.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

In general, an example system operates to collect data (such as images and point cloud data) about an environment, such as a warehouse environment, and automatically identify objects in the environment and annotate point cloud data of the environment with the identification of the objects, so that the point cloud of the environment contains identifiers of the objects. The system can automatically annotate a point cloud that identifies coordinates of objects (and their subparts) in three-dimensional space. The system can train models of physical objects based on training data, and then apply the models to point clouds that are generated by various point cloud generating devices to annotate the points in the point clouds with object identifiers. Examples of such point cloud generating devices include devices using stereoscopic vision, LIDAR, etc. The annotations can be applied in real time (or near real time) and can be used to provide a variety of enhancements, such as annotating objects in a display, deleting objects from the point cloud, and/or generating maps/models of the physical space. Such annotated point clouds can be used to create blueprints of warehouses.

Figure 1:
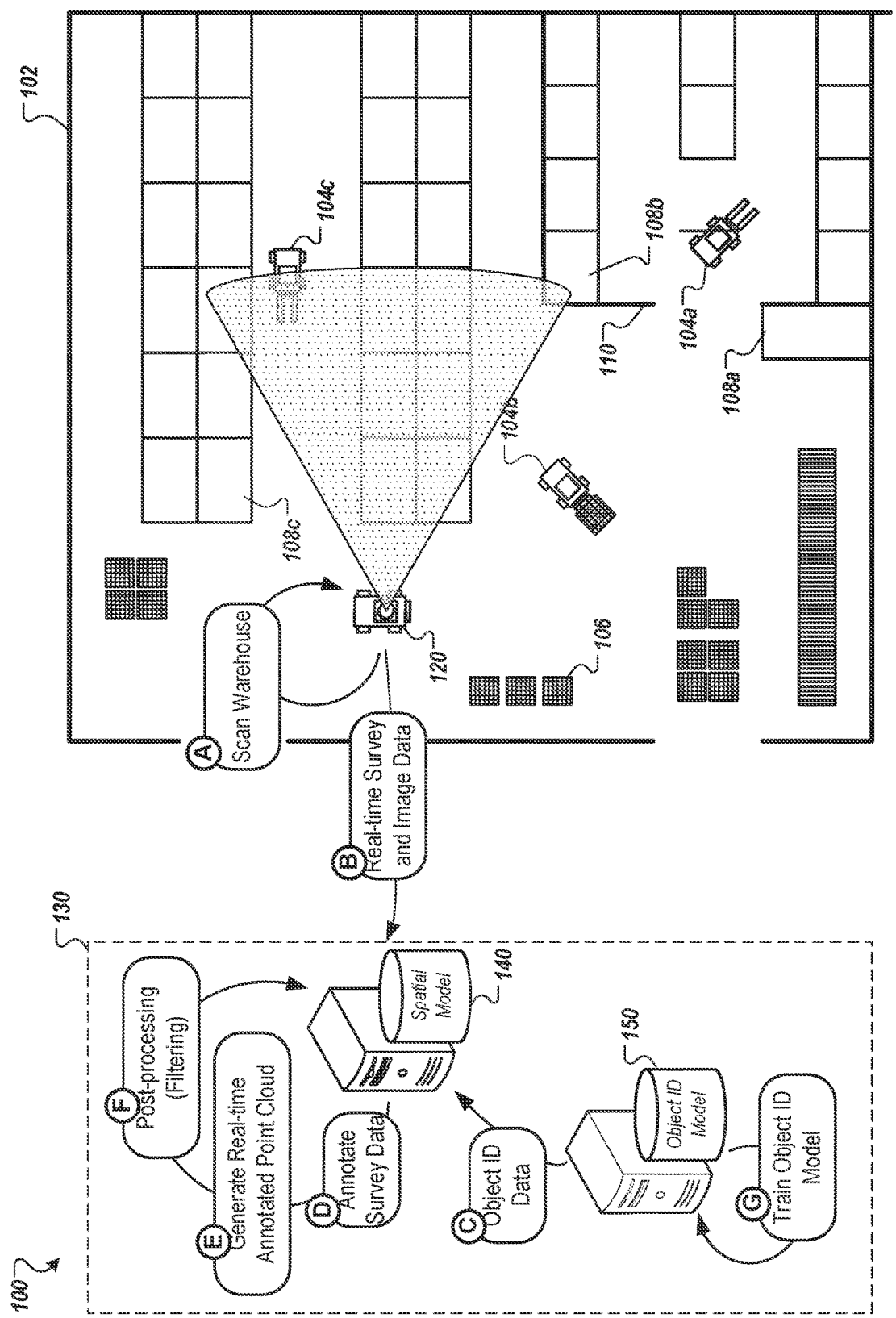
FIG. 1 depicts an example system for automatically annotating a point cloud that models a warehouse environment.

FIG. 1 depicts an example system 100 for automatically annotating a point cloud that models a warehouse environment 102. The warehouse environment 102 can include various vehicles, such as forklifts 104a, 104b, 104c (collectively, 104), which move throughout the warehouse environment 102. The warehouse environment 102 can further include various movable objects, such as pallets 106, which may be transported by vehicles. The warehouse environment 102 can include various fixed objects, such as racks 108a, 108b, 108c (collectively 108) and doors 110, which generally do not move throughout the warehouse environment 102.

As discussed in further detail below, the warehouse environment 102 can be represented by a spatial model, such as a point cloud, that tracks the location of vehicles, movable objects, and fixed objects within the environment 102 in real time. The warehouse environment 102 can be provided with a warehouse scan vehicle 120 that can scan objects and surroundings throughout the warehouse environment 102. The warehouse scan vehicle 120 can communicate with a warehouse modeling system 130 which can generate an annotated point cloud that models the warehouse environment 102. In some implementations, and as discussed in further detail below, a spatial model (e.g., an annotated point cloud) of the warehouse environment 102 can be rendered for output by one or more display devices (e.g., display devices of the warehouse scan vehicle and/or forklifts). For example, the warehouse scan vehicle 120 and/or the forklifts 104 can include a mobile computing device (e.g., a tablet device) that displays the spatial model of the warehouse environment 102. As another example, a central system (e.g., the warehouse modeling system 130) can include one or more display devices that display the spatial model of the warehouse environment 102.

The warehouse scan vehicle 120 can include an image capturing device, such as a camera system, and a space scanning device, such as an optical sensor system. As the vehicle 120 moves around in the warehouse environment 102, the image capturing device operates to capture images of at least part of the warehouse environment 102 that includes objects and surroundings and generate image data. The space scanning device operates to measure distances to objects and generate optical scan data usable to generate a point cloud of the warehouse environment 102.

Although a single warehouse scan vehicle 120 is illustrated in FIG. 1, it is understood that a plurality of warehouse scan vehicles are used in the warehouse environment 102. In some implementations, the warehouse scan vehicle 120 can include one or more of the forklifts 104. For example, one or more of the forklifts 104 can be equipped with a scanning system (e.g., image capturing and space scanning devices) of the warehouse scan vehicle 120.

The warehouse modeling system 130 is configured to receive and process data, such as the image data and the optical scan data, from the warehouse scan vehicle 120. The warehouse modeling system 130 can process the optical scan data and generate a point cloud of the warehouse environment 102 using a spatial model 140. The warehouse modeling system 130 can process the captured images (e.g., the image data) to recognize the objects (e.g., pallets, racks, frames, forklifts, and other movable and stationary objects). The warehouse modeling system 130 can use an object identification model 150 to identify the objects in the images. The object identification model 150 can provide object identification data, and the warehouse modeling system 130 can annotate the optical scan data with identification of the objects based on the object identification data, so that the identification of the objects are projected on the point cloud. Objects in the point cloud can be annotated with various identifiers, such as using names, numbers, colors, line types, symbols, and/or other suitable identification methods. Such object identification and annotation of a point cloud can be performed in real time as the data about a warehouse is collected.

In addition, the warehouse modeling system 130 can operate to selectively filter objects from a point cloud. For example, if a user is only interested in managing pellets of items in the warehouse environment 102, the system 130 can be configured to remove objects (e.g., forklifts and humans) other than pellets from a point cloud. The system can identify such undesired objects based on the annotation included in a point cloud, and simply remove the identified objects from the point cloud. Such filtering of annotated point clouds can be performed in real time as the data about a warehouse is collected, or after the data about an entire warehouse (or an entirety of a desired area of a warehouse) has been collected.

The warehouse modeling system 130 can train the object identification model 150 to improve recognition of objects, such as pallets, forklifts, humans, etc., which frequently or constantly change their positions and orientations in a warehouse. The warehouse modeling system 130 can use the annotated point cloud data to train the object identification model 150. In addition or alternatively, the collected image data and/or optical scan data can be used to train the object identification model 150.

Referring still to FIG. 1, an example process for generating an annotated point cloud for a warehouse environment 102 is described. The warehouse scan vehicle 120 can move through and scan the warehouse environment 102 (Step A) to generate survey and image data. For example, the warehouse scan vehicle 120 can generate the survey and image data by capturing images as well as measuring distances to objects. The warehouse scan vehicle 120 can transmit the survey and image data to the warehouse modeling system 130 in real time (Step B).

The warehouse scan vehicle 120 can be driven by a user who rides thereon or remotely controlled by a user. Alternatively, the warehouse scan vehicle 120 can be automatically controlled to navigate through the warehouse environment 102. Although a warehouse scan vehicle 120 is primarily illustrated herein, it is understood that the warehouse scan vehicle 120 can be replaced by a human who holds a scan device having the same or similar functionalities of the vehicle and moves through the warehouse environment 102 to scan the warehouse environment 102.

The warehouse modeling system 130 can retrieve object identification data (Step C). In some implementations, the object identification data can be generated using the object identification model 150. The object identification model 150 can use one or more various techniques. Such techniques may include, for example, appearance-based methods (e.g., edge matching, greyscale matching, gradient matching, modelbases, or other suitable appearance-based methods), feature-based methods (e.g., interpretation trees, pose clustering, geometric hashing, invariance methods, or other suitable feature-based methods), and/or genetic algorithms.

The warehouse modeling system 130 can annotate the survey data (e.g., optical scan data) to include identification of objects in the survey data (Step D). For example, the survey data can be annotated by associating points (e.g., xyz coordinates) of the survey data with information indicative of objects identified from the object identification data.

The warehouse modeling system 130 can generate an annotated point cloud of the warehouse environment 102 in real time (Step E). For example, a display device can generate and show the annotated point cloud based on the annotated scan data. The annotated point cloud provides a point cloud of the warehouse environment 102 that also shows identifiers of objects that are mapped to the points in the point cloud of the warehouse environment 102. The annotated point cloud can be displayed via one or more display devices, such as display devices of the warehouse scan vehicle 120, forklifts 104, and/or other computing devices.

The warehouse scan vehicle 120 can transmit data to the warehouse modeling system 130 in real time, so that the warehouse modeling system 130 can generate an annotated point cloud for part of the warehouse environment 102 while the warehouse scan vehicle 120 is still in the process of scanning the remaining of the warehouse environment 102. For example, while the warehouse scan vehicle 120 moves around and scans the warehouse environment 102, the scanned data (e.g., survey and image data) can be transmitted from the warehouse scan vehicle 120 to the warehouse modeling system 130, and the warehouse modeling system 130 processes the received data to generate an annotated point cloud for the scanned part of the warehouse environment 102. In the meantime, the warehouse scan vehicle 120 continues to scan another part of the warehouse environment 102 and transmit data to the warehouse modeling system 130 so that an annotated point cloud of such another part of the warehouse environment 102 can continue to be generated.

The warehouse modeling system 130 can perform post processing of the annotated point cloud (Step F). In some implementations, the warehouse modeling system 130 can selectively filter objects from the annotated point cloud. The warehouse modeling system 130 can remove objects that are determined to be undesired, thereby providing a filtered point cloud for predetermined purposes. In embodiments where an annotated point cloud is used to identify and/or count pallets in a warehouse, the warehouse modeling system 130 can remove other objects, such as forklifts and humans, which may block the view of pallets in the annotated point cloud.

The warehouse modeling system 130 can train the object identification model 150 (Step G). For example, the warehouse modeling system 130 can include a training model for the object identification model 150, and feed the collected survey and image data to the training model to improve the object identification model 150 for better recognition of objects in a warehouse environment 102.

Figure 2:
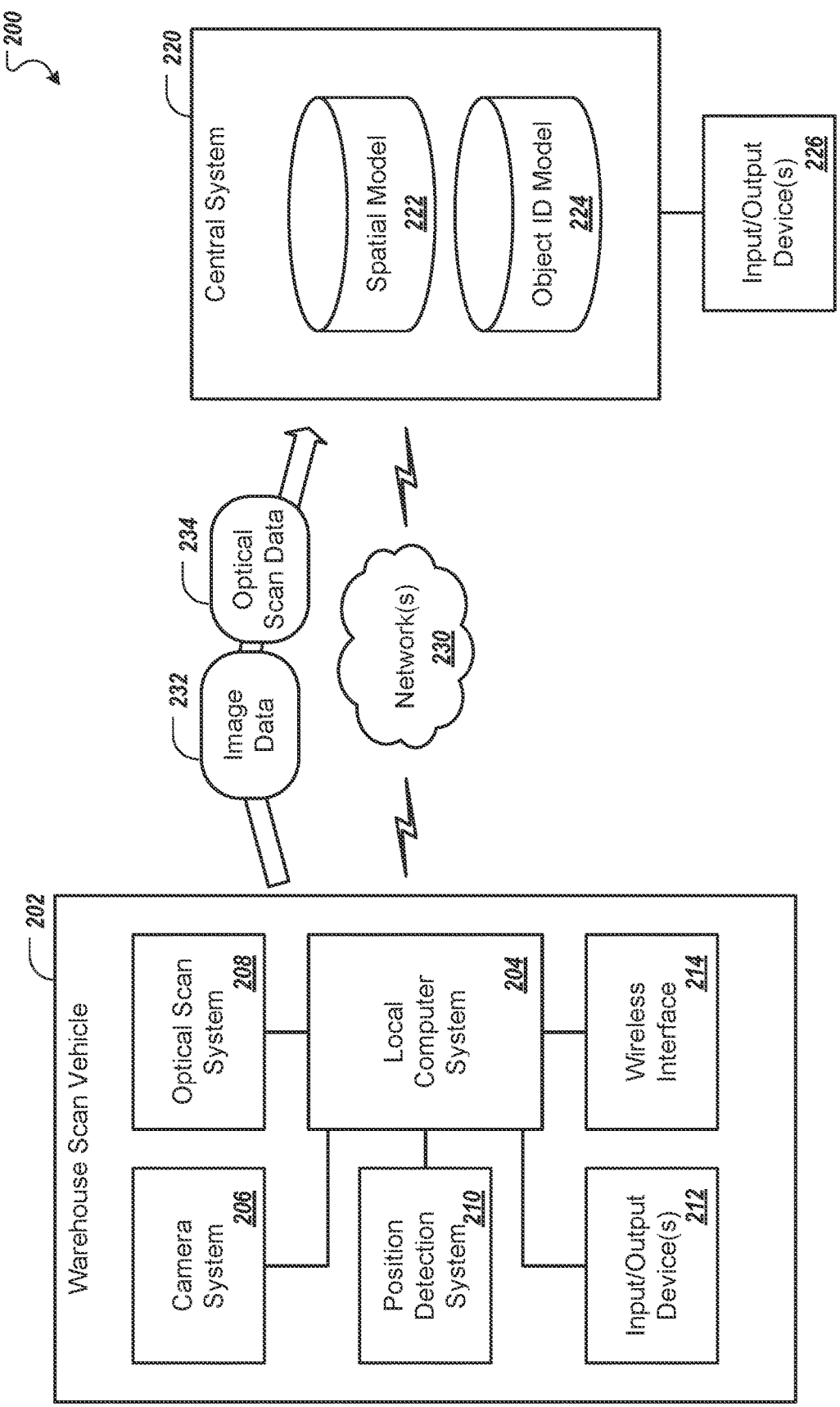
FIG. 2 is a block diagram of an example system for generating an annotated point cloud of a warehouse environment.

FIG. 2 is a block diagram of an example system 200 for generating an annotated point cloud of a warehouse. The example system 200 includes a warehouse scan vehicle system 202 which includes multiple subsystems and components for imaging/scanning environmental conditions, for receiving, processing, and transmitting sensor data, and for receiving and processing spatial model information (e.g., annotated point cloud) from a central system 220. The subsystems and components of the warehouse scan vehicle system 202, for example, can be integrated with a vehicle (e.g., a suitable type of manually operated or autonomous vehicle, robot, and/or device (including a handheld device)), communicatively coupled with the vehicle, and/or transported by the vehicle.

The warehouse scan vehicle system 202, for example, includes a local computer system 204, which can be communicatively coupled with (e.g., using wired and/or wireless connections) a camera system 206, an optical scan system 208, a position detection system 210, one or more input/output devices 212, and a wireless interface 214. The local computer system 204, for example, can include one or more processors, memory devices, storage devices, and communication ports for receiving, processing, and transmitting data. In some implementations, the local computer system can be or include a mobile computing device such as tablet computer or another suitable mobile computing device. The camera system 206, for example, can include one or more stereoscopic cameras or other image capturing devices.

The optical scan system 208 can be configured to implement a light detection and ranging (Lidar) technique. A Lidar method is a surveying method that measures distance to a target by illuminating a target (e.g., objects and surroundings in a warehouse environment) with pulsed laser light (e.g., ultraviolet, visible, or near-infrared light) and measuring the reflected pulses with a sensor. Differences in laser return times and wavelengths can be used to make digital 3-D representations of the target.

The optical scan system 208 includes one or more sensors which can supply their own illumination source. The energy source hits objects and the reflected energy is detected and measured by sensors. Distance to an object is determined by recording the time between transmitted and backscattered pulses and by using the speed of light to calculate the distance traveled. In some implementations, flash Lidar can be used to allow for 3D imaging because of the camera's ability to emit a larger flash and sense the spatial relationships and dimensions of area of interest with the returned energy.

In some implementations, the distance measurements can be transformed to measurements of actual three-dimensional points of the reflective target in object space. Such transformation may be performed with the positional information detected by, for example, the position detection system 210.

The position detection system 210 may be optionally provided to determine the position and orientation of sensors in the system 202. In some implementations, the positioning detection system 210 can include a Global Positioning System (GPS), an inertial measurement unit (IMU) (configured to measure roll, pitch, and/or heading of the system), etc.

A Lidar system can produce mass point cloud datasets that can be managed, visualized, analyzed, and shared using the central system 220. For example, the three-dimensional point data can be processed into highly accurate georeferenced x,y,z coordinates by analyzing the laser time range, laser scan angle, GPS position, and/or INS information. Point clouds can include large collections of 3D elevation points, which include x, y, and z.

Regarding Lidar laser returns, laser pulses emitted from a Lidar system reflect from objects both on and above the ground surface. One emitted laser pulse can return to the Lidar sensor as one or many returns. Any emitted laser pulse that encounters multiple reflection surfaces as it travels toward the ground is split into as many returns as there are reflective surfaces. The first returned laser pulse is the most significant return and will be associated with the closest feature in an area being scanned. The first return can also represent the ground (e.g., the floor of a warehouse), in which case only one return will be detected by the Lidar system. Multiple returns are capable of detecting the elevations and/or relative distance of several objects within the laser footprint of an outgoing laser pulse.

The warehouse scan vehicle system 202 can include the input/output devices 212 and the wireless interface 214. The warehouse scan vehicle system 202 can include various input devices (e.g., touchscreens, microphones, pointing devices, keyboards, scanners, and other suitable input devices), and various output devices (e.g., display screens, speakers, tactile output devices, and other suitable output devices). The wireless interface 214, for example, can include a communication interface for wireless communication with other vehicle systems and/or the central system 220 using one or more long-range and/or short-range communication protocols.

The central system 220 can include one or more computer servers and one or more databases. For example, the central system 220 can be or include various types of servers including, but not limited to, an application server, a web server, a web server, a proxy server, or a server farm. In the present example, the central system 220 maintains a spatial model 222. The spatial model 222, for example, can be implemented as a point cloud system in which data points are defined in a three-dimensional coordinate system using X, Y, and Z coordinates. Various objects in a warehouse environment, for example, can be represented in the spatial model 222, and corresponding locations of the objects can be tracked using the three-dimensional coordinate system (e.g., using a Simultaneous Location and Mapping (SLAM) algorithm).

The central system 220 can maintain an object ID model 224 which can be used to identify objects from images of a warehouse environment. The object ID model 224 can use one or more various techniques. Some examples of the techniques include appearance-based methods (e.g., edge matching, greyscale matching, gradient matching, modelbases, or other suitable appearance-based methods), feature-based methods (e.g., interpretation trees, pose clustering, geometric hashing, invariance methods, or other suitable feature-based methods), and/or genetic algorithms.

The central system 220 can also include and/or communicate with one or more input/output devices 226. The input/output devices 226, can include various input devices (e.g., touchscreens, microphones, pointing devices, keyboards, scanners, and other suitable input devices), and various output devices (e.g., display screens, speakers, tactile output devices, and other suitable output devices).

Communication between the warehouse scan vehicle system 202 and the central system 220 can occur over one or more networks 230. Examples of the network(s) 230 include a local area network (LAN), a wide area network (WAN), and the Internet. In the present example, image data 232 based on images captured by the camera system 206 and optical scan data 234 based on distance measurements (and/or other data) obtained by the optical scan system 208 are provided by the warehouse scan vehicle system 202 over the network(s) 230 to the central system 220. After receiving the image data 232 and the optical scan data 234, for example, the central system 220 can generate annotated point cloud data using the spatial model 222 and the object ID model 224, and provide the annotated point cloud data to the warehouse scan vehicle system 202 for display of an annotated point cloud of the warehouse being scanned in real time.

In some implementations, at least a portion of the spatial model 222 and/or the object ID model 224 may be maintained by the local computer system 204 of the warehouse scan vehicle system 202. For example, the central system 220 can provide a portion of the spatial model 222 and/or the object ID model 224 to the warehouse scan vehicle system 202 that corresponds to a predetermined area surrounding the vehicle. While the vehicle is in a predetermined area of a warehouse, for example, the warehouse scan vehicle system 202 can use the local computer system 204 to generate annotated point cloud data of the predetermined area of the warehouse without sending image data 232 and optical scan data 234 to the central system 220. By maintaining at least partially the spatial model and/or object ID model, for example, point cloud data can be quickly generated, and a point cloud of a warehouse can be quickly displayed, without a continuous connection to the network(s) 430.

Figure 3:
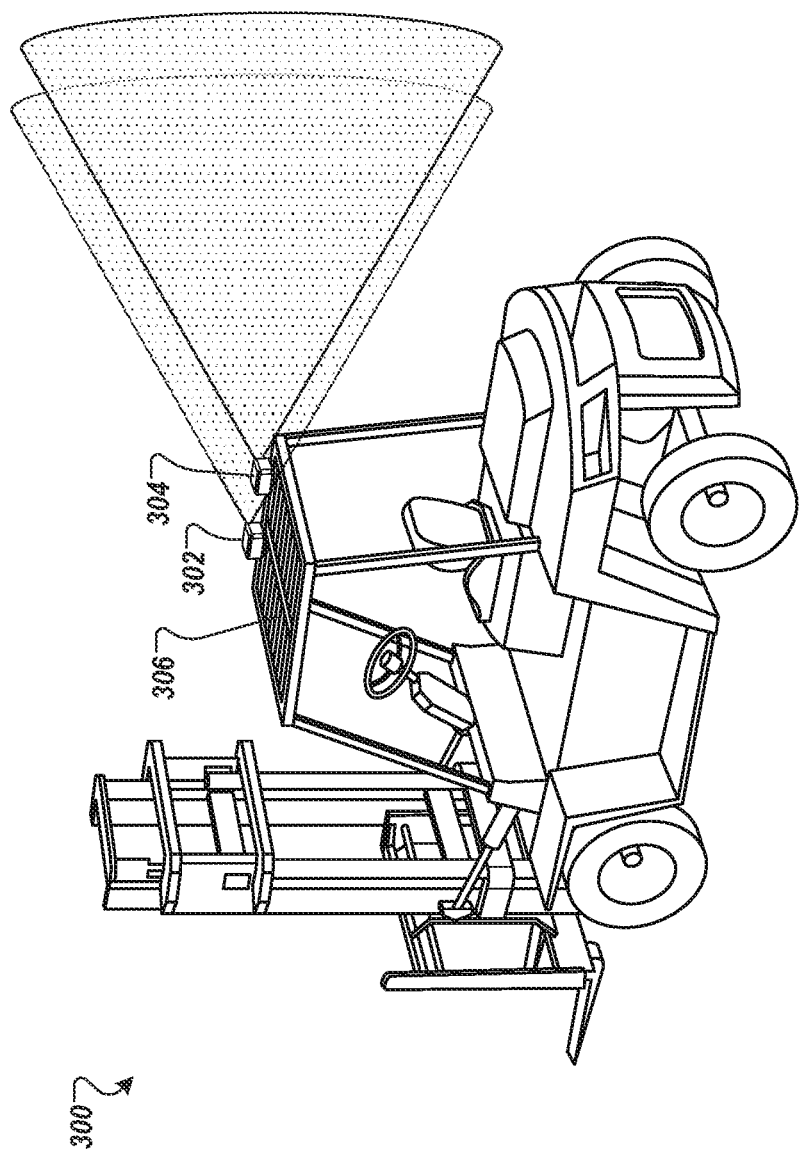
FIG. 3 illustrates an example configuration of a vehicle for scanning a warehouse environment.

FIG. 3 illustrates an example configuration of a vehicle 300 for scanning a warehouse. In this example, the vehicle 300 is configured as a forklift. The vehicle 300 is equipped with a camera device 302 and a scanning device 304.

In some implementations, the camera device 302 and the scanning device 304 may include one or more enhancements for adapting the devices to a warehouse environment such as a cold storage facility. For example, the devices 302 and 304 can include a lens heater to prevent condensation in a cold and/or humid environment. As another example, the lenses can be sealed, and/or a desiccant can be used to reduce moisture. As another example, plastic and/or rubber can be included in mounting units for the devices (e.g., camera mounting units) to dampen vibration that may be caused by vehicle movement and to withstand contact from strip curtain flaps. Plastic and/or rubber materials selected for the mounting units can have properties that cause the materials to be resistant to cracking or crumbling and to withstand temperature changes.

In some implementations, the camera device 302 is capable of determine a distance between the camera device and an object being capture. The camera device 302 may include a distance sensor or a device for such functionality. For example, the camera device 302 can include a Lidar scanner, a structured light, or a time-of-flight (ToF) sensor.

A 3D component measured by such distance sensors can be overlapped with an image to create a point cloud. Further, the automatic image annotations can connect to the points in the 3D 'image' points and label those points with the annotations from the image.

The camera device 302 can include a stereoscopic camera which may have two or more lenses with separate image sensors for each lens, thus allowing the camera to simulate human binocular vision to perceive depth in a scene and relative distances of objects from the camera. In some implementations, the stereoscopic camera can be a digital video camera that captures images in real time at fixed time intervals (e.g., 15 frames per second, 30 frames per second, 60 frames per second, or another suitable time interval). Stereoscopic image data based on the captured images can be provided to a computing device for further processing, for example.

In some implementations, the camera device 302 includes a single camera affixed to the vehicle 300. In the present example, a single stereoscopic camera is affixed to an overhead guard 306 of the vehicle 300 (e.g., on top of or underneath the guard) such that the stereoscopic camera is aimed in a desired direction (e.g., a direction toward behind the forklift). By pointing the camera device 302 behind the forklift, for example, images captured by the camera may be unobstructed by the forklift and its operator. However, in some circumstances, a front-facing camera may be appropriate if obstruction from the forklift and its operator can be avoided or accounted for.

In other implementations, the camera device 302 includes multiple stereoscopic cameras affixed to the vehicle 300. For example, dual stereoscopic cameras are each affixed to an overhead guard 306 of the vehicle 300 (e.g., on top of or underneath the guard) such that the stereoscopic cameras are aimed in opposite directions. For example, one of the stereoscopic cameras can be pointed to the left of the vehicle, and the other stereoscopic camera can be pointed to the right of the vehicle. Dual stereoscopic cameras may be positioned such that a field of view of one camera does not overlap with a field of view of another camera. For example, the cameras can be configured to point in opposite directions, such that an angle formed between the different camera directions is substantially 180 degrees. In some implementations, dual stereoscopic cameras may be positioned such that a field of view of one camera partially overlaps with a field of view of another camera. For example, one of the cameras can be configured to point behind and to the left of the vehicle, and the other camera can be configured to point behind and to the right of the vehicle, such that an angle formed between the different camera directions is a right or obtuse angle. By pointing the stereoscopic cameras away from the front of the vehicle, for example, images captured by each of the cameras may be unobstructed by the vehicle and its operator.

The scanning device 304 can be affixed to an overhead guard 306 of the vehicle 300 (e.g., on top of or underneath the guard), and aimed in a direction so that the scanning device 304 is not obstructed by a part of the vehicle or the camera device 302. The scanning device 304 can include a laser emitter that causes a burst of light to be emitted, usually focused through a lens or lens assembly, and further include a laser detector that receives a returned light. The laser emitter can generate energy of pulses, such as near infrared wavelengths, blue green wavelengths, etc. The lasers used can be selected to be low energy and eye-safe. The scanning device 304 can measure the time it takes for the pulse of light to return to the laser detector, and derive a distance from that measurement. Each distance measurement can be considered a pixel, and a collection of pixels emitted and captured in rapid succession (e.g., a point cloud) can be rendered as an image and/or analyzed for detecting objects. Viewers that render these point clouds can manipulate the view to give the appearance of a 3-D image.

The speed at which images can be developed is affected by the speed at which it can be scanned into the system. The scanning mechanism is designed to generate a consistent stream of laser pulses. The scanning device 304 can include an optical assembly including a mirror assembly (either rotating or scanning) to reflect off the laser pulses. A variety of scanning methods are available for different purposes such as azimuth and elevation, dual oscillating plane mirrors, dual axis scanner and polygonal mirrors. The type of optic can determine the resolution and range that can be detected by a system.

The scanning device 304 can include timing electronics configured to record the exact time the laser pulse leaves and returns to the scanner. Each pulse sent out can have up to multiple returns as it reflects off of objects on the surface. Each of the returns must be precisely timed to ensure an accurate measurements for each point.

Optionally, the scanning device 304 may include a GPS for recording precise X,Y,Z location of the scanner, and/or an inertia measurement unit (IMU). The GPS together with the IMU allow for the direct georeferecing of the points. The IMU can include an accelerometer, gyroscope, and magnetometer sensors that measure the velocity, orientation, and gravitational forces. The IMU constantly records the pitch, roll, and yaw of the vehicle. This data is used to determine the precise angle and location of the scanning device 304 to ensure the distances to surfaces are correctly calculated. The scanning device 304 can include a processing device (e.g., a computing device) configured to make sure that all of the individual components of the system are working properly. The processing device can integrate the data from the laser system, the GPS and the IMU to produce a point data.

Figure 4:
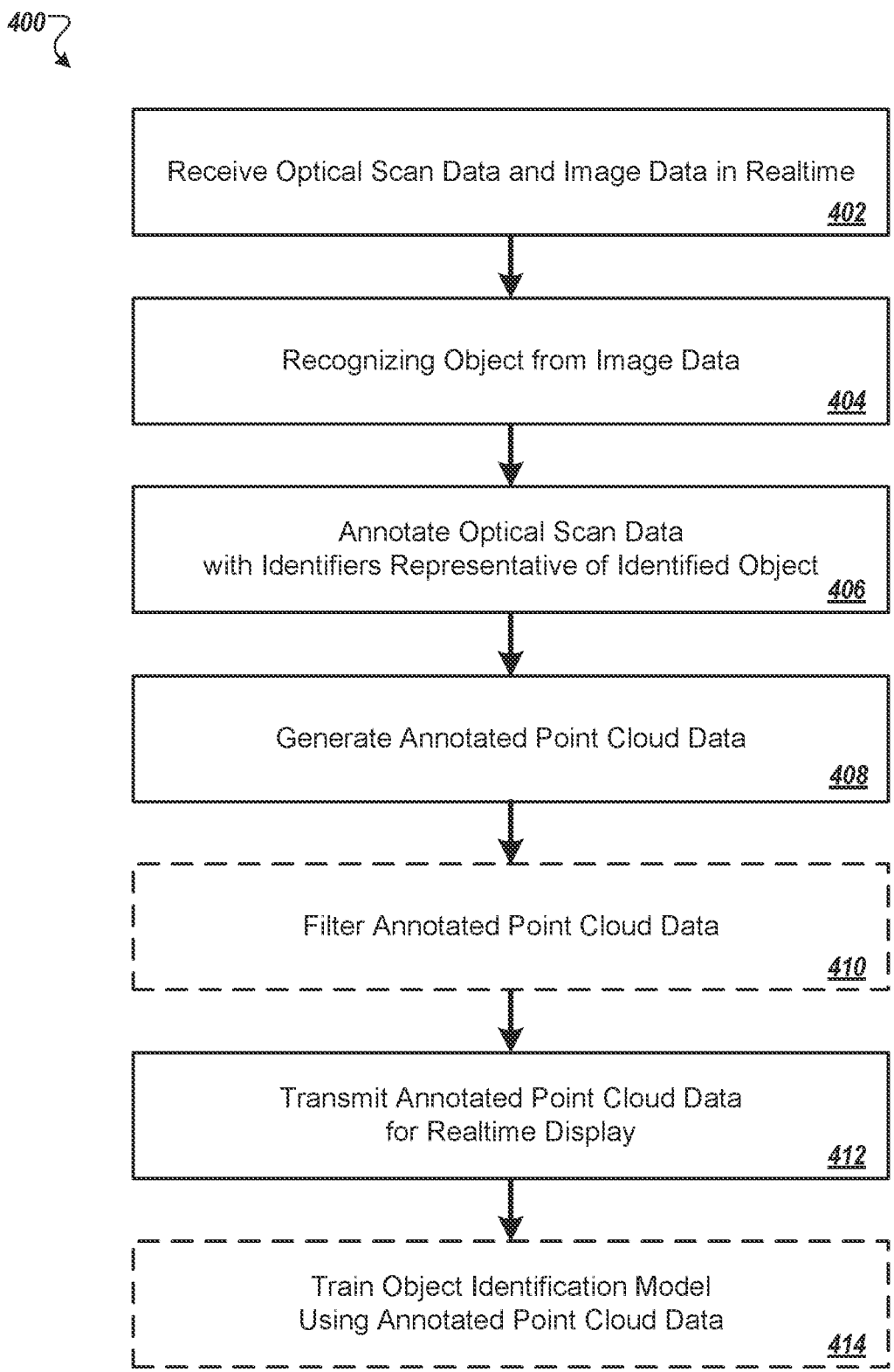
FIG. 4 is a flowchart of an example method for generating an annotated point cloud of an environment.

FIG. 4 is a flowchart of an example method 400 for generating an annotated point cloud of an environment, such as a warehouse. The example method 400 can be performed by any of a variety of appropriate systems, such as the system 200 as shown in FIG. 2.

At 402, image data and optical scan data are received. The image data can be based on at least one image (e.g., stereoscopic image) that was captured by, for example, a camera that is affixed to a vehicle, such as a warehouse scan vehicle. The optical scan data can be based on distance measurements that were measured and calculated by, for example, an optical scanner affixed to the vehicle. The image data and the optical scan data can be received in real time as they are collected in the vehicle moving through a warehouse environment. Alternatively, the image data and the optical scan data may be received after they are collected for a desired area (e.g., the entire area or one or more partial target areas) of the warehouse environment.

For example, a vehicle 510 (e.g., the warehouse scan vehicle system 202 in FIG. 2) can capture an image of its environment and scan objects and surroundings in the environment using an image/scan system 512. The vehicle 510 can provide image and scan data (e.g., the image data 232 and the optical scan data 234 in FIG. 2) to a central system (e.g., the central system 220). Optionally, the image and scan data can be received and preprocessed locally in the vehicle (e.g., by the local computer system 204) prior to sending the data to the central system.

Figure 5:
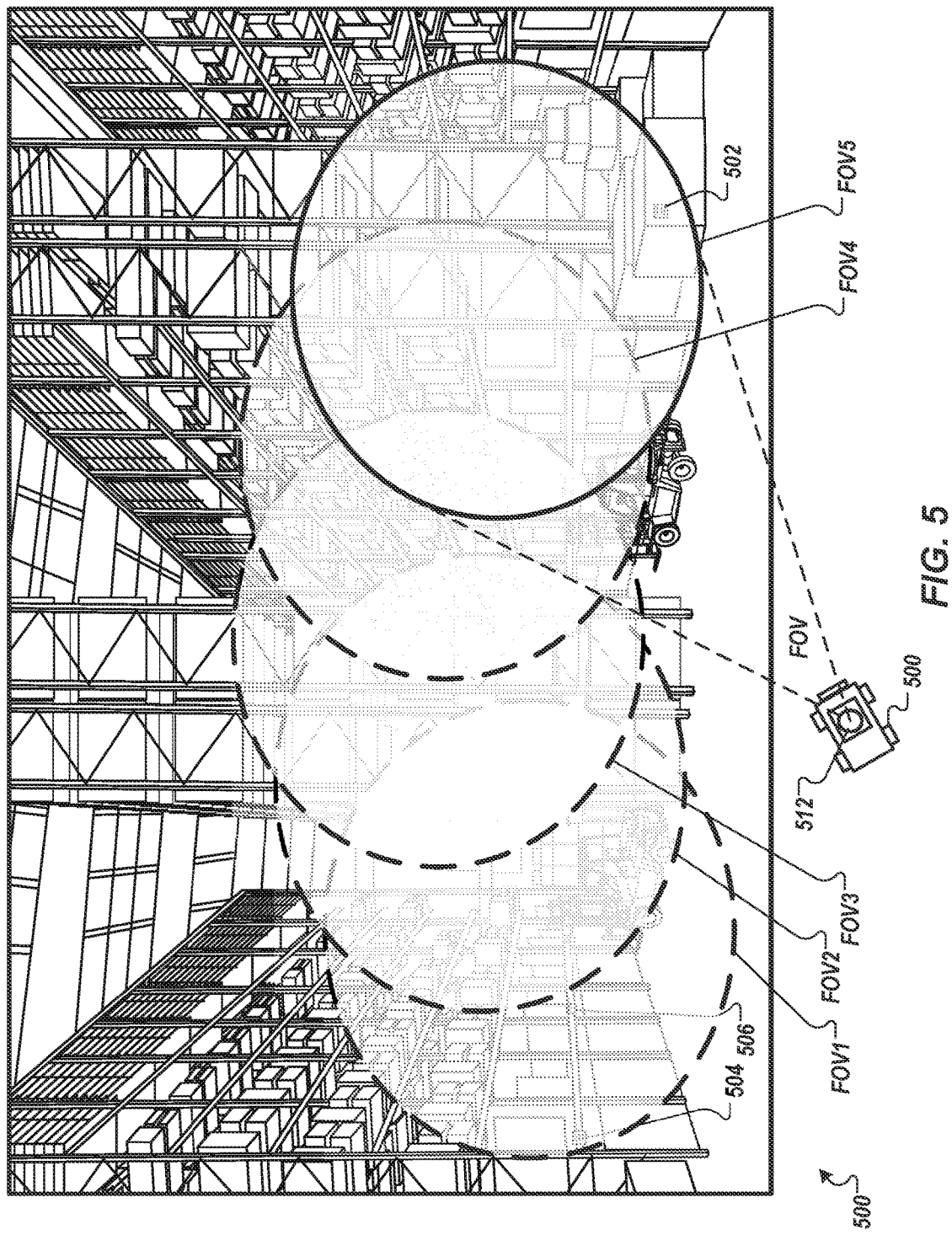
FIG. 5 illustrates an example warehouse environment that is being imaged and scanned as a vehicle moves through the warehouse environment.

As shown in FIG. 5, the image/scan system 512 has a field of view (FOV) on a warehouse environment 500, and operates to capture an image and scan objects/surroundings in the field of view as the vehicle 510 moves and changes the field of view (e.g., FOV1-FOV5) throughout the warehouse environment 500. The image/scan system 512 can include a camera (e.g., the camera system 206) and a scan system (e.g., the optical scan system 208). Although the image/scan system 512 is primarily illustrated to have a same field of view, it is understood that the camera and the scan system of the image/scan system 512 have different fields of view from the vehicle 510.

In some implementations, stereoscopic image data may be based on a series of stereoscopic images received in real time as the images are captured by a stereoscopic camera. For example, the camera system 206 can be a digital stereoscopic video camera that captures images in real time at fixed time intervals (e.g., 15 frames per second, 30 frames per second, 60 frames per second, or another suitable time interval). The image data 232, for example, may be provided at time intervals that correspond to a frame rate of the digital stereoscopic video camera that captures the images, or may be provided at less frequent time intervals. For example, the vehicle system 202 can receive stereoscopic images from the camera system 206 in accordance with a frame rate of the stereoscopic camera, and can provide raw or preprocessed stereoscopic image data at less frequent intervals (e.g., twice per second, once per second, every other second), or at another suitable time interval by skipping frames. By providing stereoscopic image data at an interval that is less frequent than a frame rate of a stereoscopic camera that captures the images, for example, an amount of data provided over the network(s) 230 between the vehicle system 202 and the central system 220 can be reduced, thus conserving bandwidth.

In addition, optical scan data may be based on point cloud datasets which are created using the distance measurements calculated by an optical scan system, such as a Lidar scanner. For example, the optical scan system 208 emits pulse laser light and measures reflected pulses so that differences in laser return times and/or wavelengths can be used to generate point cloud data. The optical scan data 234, for example, may be transmitted to the central system 220 together with the image data 232. In some implementations, the optical scan data 234 can be provided at the same time intervals as the image data 232. Alternatively, the optical scan data 234 can be transmitted at different time intervals (e.g., more or less frequent, or time-shifted) than the image data 232.

At 404, one or more objects are recognized from the image data. For example, the local computer system 204 and/or the central system 220 can perform object recognition techniques to identify the object. Object recognition techniques (e.g., the object identification model 224), for example, may include appearance-based methods (e.g., edge matching, greyscale matching, gradient matching, model-bases, or other suitable appearance-based methods), feature-based methods (e.g., interpretation trees, pose clustering, geometric hashing, invariance methods, or other suitable feature-based methods), and/or genetic algorithms. In some implementations, object recognition techniques may be facilitated by object identification markers attached to vehicles, movable objects, and/or fixed objects within an environment. Referring to FIG. 5, for example, a warehouse environment 500 shows various object identification markers (e.g., markers 502, 504, and 506). The object recognition techniques, for example, can be optimized for recognition of the type of marker selected for use within the environment.

At 406, the optical scan data are annotated with identifiers of the objects. For example, the local computer system 204 and/or the central system 220 can retrieve identifiers that represent the objects recognized from the image data, and modify the optical scan data to associate the identifiers with the points representative of the corresponding objects in the optical scan data.

In some implementations, a variety of objects that may be recognized in a warehouse environment may be categorized into different groups, such as pallets, type of items/packages on pallets, racks, forklifts, humans, etc. Identifiers can be used to represent each group of objects in a point cloud. In addition or alternatively, identifiers are assigned to represent individual objects of same or different categories in a point cloud. Identifiers can include information (e.g., unique identifier) that identifies each object. Such identifiers can be of various types, such as names, numbers, colors, line types, symbols, and/or other suitable identification methods in a point cloud.

At 408, annotated point cloud data is generated. The annotated point cloud data can be generated based on the optical scan data annotated with the object identifiers (or the information representative of the object identifiers). Annotated point cloud data can include location information of the annotated points. Various location detection algorithms can be used to identify the locations of points in the annotated point cloud data. Examples of such location detection algorithms include simultaneous localization and mapping (SLAM), frame matching, and other suitable techniques.

Figure 7:
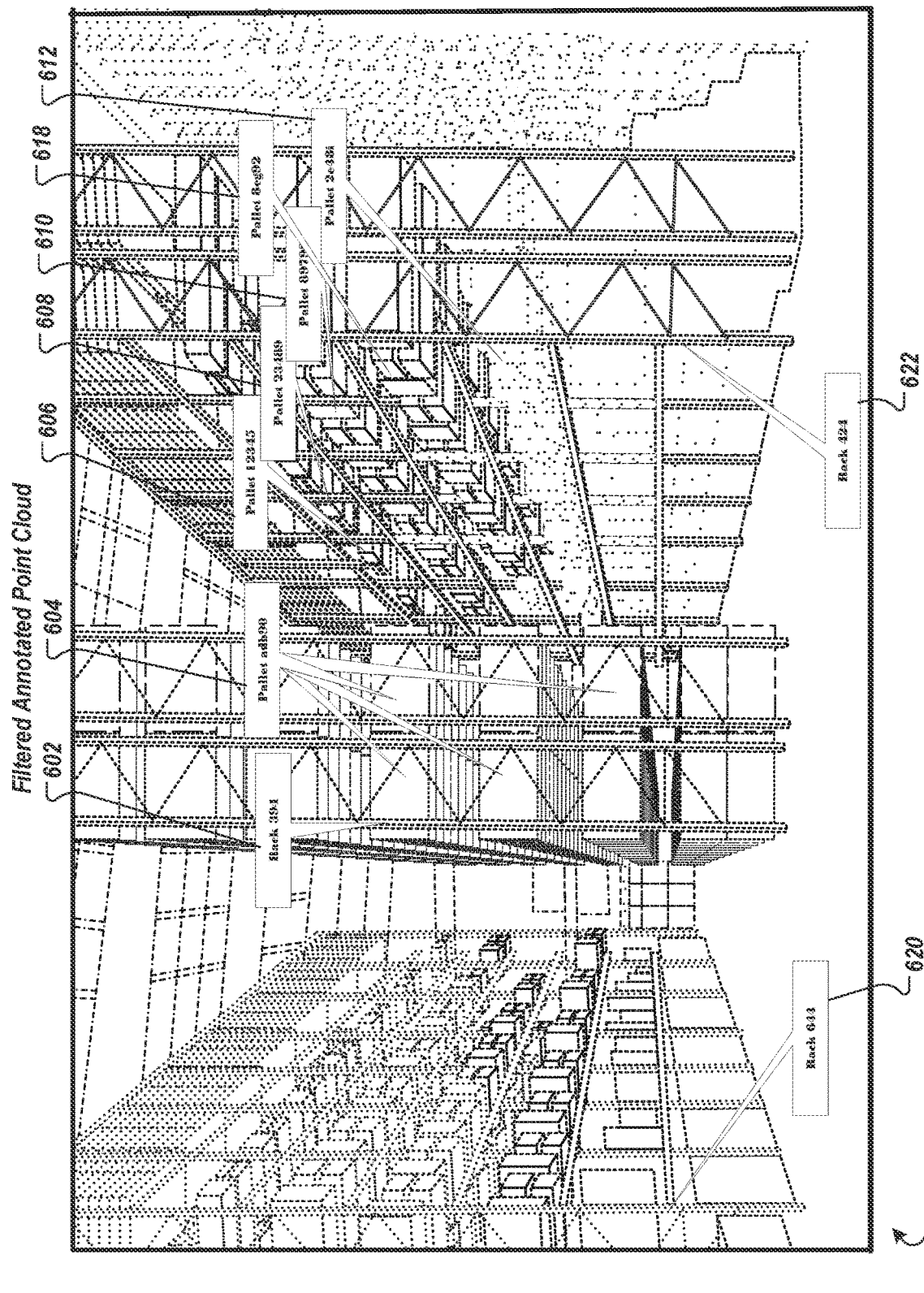
FIG. 7 illustrates an example filtered point cloud of an example warehouse environment.

At 410, in some implementations, the annotated point cloud data may be filtered. In some implementations, the annotated point cloud data can be modified to remove data indicative of one or more undesired objects. For example, moving objects, such forklifts, can be removed from the point cloud of the warehouse, so that objects of particular interest (e.g., pallets) can be easily recognized in the point cloud. In the example of FIG. 7, data representative of forklifts have been filtered out from the annotated point cloud 600 so that the point cloud generated using the filtered annotated point cloud does not show forklifts in the view of the warehouse. The filtering can be performed prior to transmitting the annotated point cloud data to a display device for displaying a point cloud based on the annotated point cloud data. Alternatively or in addition, the filtering can be performed after a point cloud is once displayed and later updated.

Undesired objects can be predetermined. For example, a rule can be provided which defines objects to be removed from annotated point cloud data. Thus, the filtering can include retrieving the rule and removing data of the undesired objects based on the rule. In addition or alternatively, undesired objects can be manually selected by, for example, a user input through a display device (e.g., a touchscreen) that displays the point cloud. For example, a user can select an undesired object by tapping an object identifier of the undesired object on the display device, and the system can remove the selected objects from the display of the point cloud. Undesired objects may be simply hidden from the display of the point cloud. Alternatively, the annotated point cloud data can be modified to remove data representative of undesired objects so that the undesired objects are not shown in the point cloud.

Figure 6:
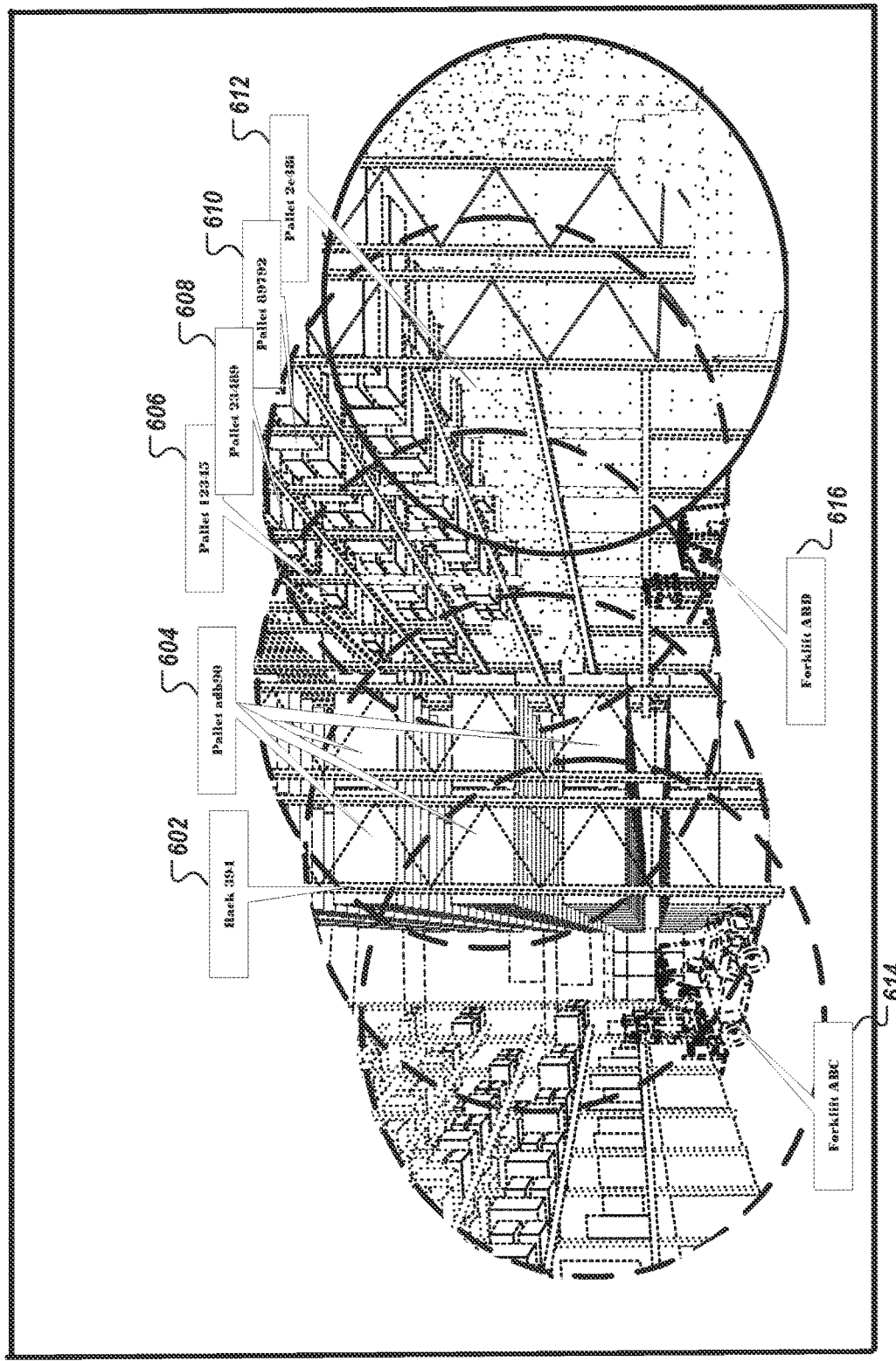
FIG. 6 illustrates an example annotated point cloud of an example warehouse environment being displayed in real time.

At 412, the annotated point cloud data can be transmitted to one or more display devices to display an annotated point cloud. In addition or alternatively, the annotated point cloud data can be used to generate a blueprint of the warehouse. As illustrated in FIG. 5, as the vehicle 510 moves to change a field of view (FOV), the annotated point cloud data with respect to the field of view can be generated and transmitted to one or more display devices in real time, such as a display device of the vehicle 510, a display device of the central system 220, and/or display devices of other computing devices. As illustrated in FIG. 6, for example, an annotated point cloud 600 can be displayed in real time, and can grow as it traces the change in the field of view of the vehicle. As shown, the annotated point cloud 600 includes object identifiers 602-616 that identify the objects, such as pallets, racks, forklifts, etc. in the scanned region of the warehouse environment (e.g., the area within the moving field of view of the vehicle). When the vehicle has moved through a predetermined area in a warehouse and finished the imaging and scanning the area, an annotated point cloud 600 is displayed for the entire area of the warehouse, as illustrated in FIG. 7. The annotated point cloud 600 can include object identifiers for all the objects included in the point cloud. Alternatively, the annotated point cloud 600 can include object identifiers for some objects, such as objects of interest (e.g., pallets and items/goods).

At 414, the object identification model may be trained. The annotated point clouds generated by the system can be used as training data to train the object identification model (e.g., the object ID model 224 in FIG. 2) so that the central system can improve recognition of moving objects, such as pallets, forklifts, humans, etc., which frequently or constantly change their positions and orientations in a warehouse environment.

Figure 8:
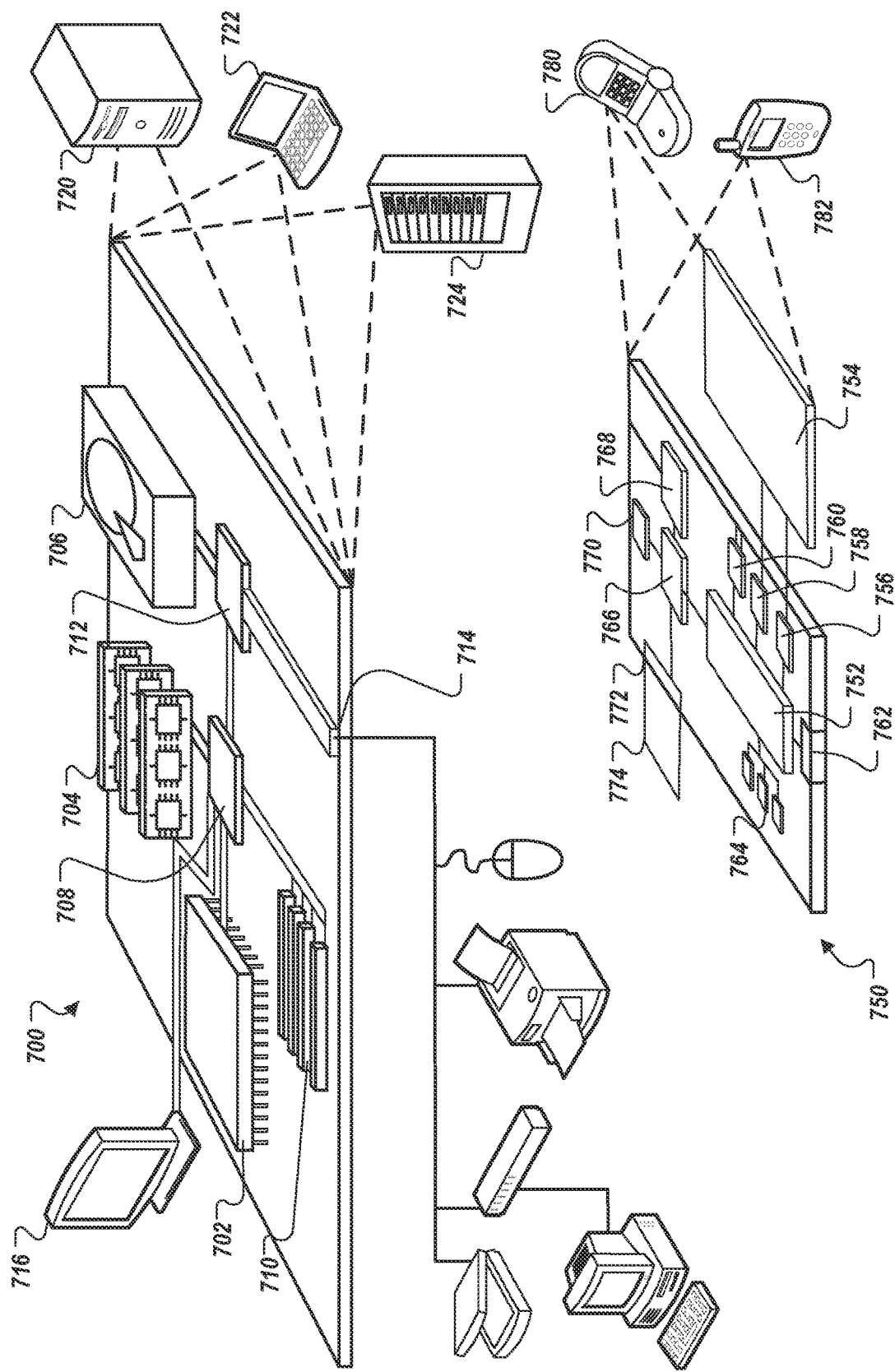
FIG. 8 is a block diagram of computing devices that may be used to implement the systems and methods described in this document.

FIG. 8 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provided, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for modeling space in a storage facility, the method comprising:
   receiving, from an optical scanning system and an imaging system, optical scan data and image data, respectively, based on the optical scanning system and the imaging system moving at a storage facility;
   identifying objects that are represented in the image data;
   determining identifiers that represent the objects;
   annotating the optical scan data with the identifiers to generate annotated point cloud data;
   generating a map of the storage facility based on the annotated point cloud data; and
   returning, to a computing system, the map of the storage facility for presentation in a graphical user interface (GUI) display of the computing system.

2. The computer-implemented method of claim 1, wherein the map is a three-dimensional (3D) model of the storage facility.

3. The computer-implemented method of claim 1, wherein the optical scan data includes measured distances between the objects that are represented in the image data.

4. The computer-implemented method of claim 1, further comprising:
   determining, based on the map of the storage facility, directions to route a vehicle from a first location to a second location in the storage facility; and
   transmitting instructions to a computing device of the vehicle that, when executed, causes the computing device to present, in a GUI display of the computing device, the directions.

5. The computer-implemented method of claim 1, further comprising generating, based on the annotated point cloud data, a blueprint of the storage facility.

6. The computer-implemented method of claim 1, further comprising generating, based on the annotated point cloud data for the storage facility, a blueprint of another storage facility.

7. The computer-implemented method of claim 1, further comprising determining, based on the annotated point cloud data, coordinates of the objects in the storage facility in 3D space.

8. The computer-implemented method of claim 7, wherein generating the map of the storage facility is further based on the coordinates of the objects in the storage facility in 3D space.

9. The computer-implemented method of claim 1, wherein the objects include forklifts, humans, automated warehouse vehicles, pallets, racks, shelves, and doors in the storage facility.

10. The computer-implemented method of claim 1, further comprising: removing data representative of undesired objects from the annotated point cloud data, wherein the undesired objects are defined by at least one rule.

11. The computer-implemented method of claim 10, wherein the undesired objects include at least one of vehicles and humans.

12. The computer-implemented method of claim 1, wherein the optical scanning system and the imaging system are included in a vehicle that is moved throughout the storage facility.

13. The computer-implemented method of claim 12, wherein the vehicle is a forklift.

14. The computer-implemented method of claim 1, wherein the optical scanning system and the imaging system are part of a handheld scanning device, the handheld scanning device being moved around the storage facility by a human operator.

15. The computer-implemented method of claim 1, further comprising generating a spatial model of the storage facility based on the annotated point cloud data, wherein the spatial model tracks, in the storage facility, locations of vehicles, movable objects, and fixed objects.

16. The computer-implemented method of claim 15, wherein the spatial model is a point cloud.

17. The computer-implemented method of claim 15, wherein the spatial model tracks, in real-time and based on the annotated point cloud data, movement of the vehicles and the moveable objects in the storage facility.

18. The computer-implemented method of claim 1, wherein the optical scan data and the image data are received in real-time as the optical scanning system and the imaging system move in the storage facility.

19. The computer-implemented method of claim 1, further comprising determining, based on the map of the storage facility, sizes or dimensions of the objects in the storage facility.

20. The computer-implemented method of claim 1, further comprising determining, based on the sizes or dimensions of the objects in the storage facility, a size or dimensions of the storage facility.

\* \* \* \* \*